US012044054B2

(12) United States Patent
Poltschak et al.

(10) Patent No.: US 12,044,054 B2
(45) Date of Patent: Jul. 23, 2024

(54) VEHICLE DOOR DEVICE WITH A CURRENTLESS OPENING FUNCTION

(71) Applicant: KNORR-BREMSE GESELLSCHAFT MIT BESCHRÄNKTER HAFTUNG, Mödling (AT)

(72) Inventors: Florian Poltschak, Linz (AT); Michael Ernst, Hilm (AT)

(73) Assignee: KNORR-BREMSE GESELLSCHAFT MIT BESCHRÄNKTER HAFTUNG (AT)

( * ) Notice: Subject to any disclaimer, the term of this patent is extended or adjusted under 35 U.S.C. 154(b) by 211 days.

(21) Appl. No.: 17/615,430

(22) PCT Filed: May 18, 2020

(86) PCT No.: PCT/EP2020/063777
§ 371 (c)(1),
(2) Date: Nov. 30, 2021

(87) PCT Pub. No.: WO2020/239489
PCT Pub. Date: Dec. 3, 2020

(65) Prior Publication Data

US 2022/0228417 A1 Jul. 21, 2022

(30) Foreign Application Priority Data

May 31, 2019 (DE) ..................... 10 2019 003 805.3

(51) Int. Cl.
*E05B 65/10* (2006.01)
*E05B 81/20* (2014.01)
*E05F 15/655* (2015.01)

(52) U.S. Cl.
CPC ............ *E05F 15/655* (2015.01); *E05B 81/20* (2013.01); *E05Y 2201/426* (2013.01);
(Continued)

(58) Field of Classification Search
CPC ........ E05F 15/655; E05B 81/20; E05B 81/90; E05B 77/02; E05Y 2201/426;
(Continued)

(56) References Cited

U.S. PATENT DOCUMENTS 3,466,805 A * 9/1969 Muessel .................... E06B 3/50 49/141
3,745,705 A * 7/1973 Reddy ..................... E05F 15/40 49/362
(Continued)

FOREIGN PATENT DOCUMENTS

CN 105696913 A 6/2016
CN 107031358 A 8/2017
(Continued)

OTHER PUBLICATIONS

International Search Report and Written Opinion corresponding to PCT/EP2020/0637777 dated Aug. 21, 2020.

*Primary Examiner* — Jerry E Redman
(74) *Attorney, Agent, or Firm* — Barnes & Thornburg LLP

(57) ABSTRACT

A vehicle sliding door device includes at least one sliding door which can be moved in a movement direction or a pivoting and sliding door which can be pivoted in a pivoting direction and which can be moved in a movement direction relative to a door frame that has a door opening, and a locking device for locking the at least one sliding door at least in the closed position that includes an emergency unlocking device, by which the at least one sliding door which is locked in the closed position can be unlocked in the event of an emergency. An emergency opening device is provided for at least partly opening the at least one sliding door or the pivoting and sliding door in the event of an emergency in an emergency unlocking state.

20 Claims, 5 Drawing Sheets

(52) U.S. Cl.
CPC ....... *E05Y 2201/46* (2013.01); *E05Y 2900/51* (2013.01); *E05Y 2900/531* (2013.01)

(58) Field of Classification Search
CPC ............. E05Y 2201/46; E05Y 2201/22; E05Y 2900/51; E05Y 2900/531; B61D 19/005
USPC ............................................................ 49/141
See application file for complete search history.

(56) References Cited

U.S. PATENT DOCUMENTS

| | | | | | |
|---|---|---|---|---|---|
| 4,070,795 | A * | 1/1978 | Lussier | E06B 3/40 | 49/141 |
| 4,652,028 | A * | 3/1987 | Logan | E05C 19/166 | 292/251.5 |
| 4,730,513 | A * | 3/1988 | Heinrich | E05F 15/63 | 192/96 |
| 5,369,912 | A * | 12/1994 | Ginzel | E05F 15/611 | 49/260 |
| 6,526,695 | B1 * | 3/2003 | Nguyen | E05D 15/48 | 49/260 |
| 7,117,637 | B2 * | 10/2006 | Delgado | E06B 9/581 | 49/141 |
| 7,296,608 | B2 * | 11/2007 | Weishar | E05F 15/643 | 160/214 |
| 8,205,387 | B2 * | 6/2012 | Ranaudo | E06B 3/4636 | 49/141 |
| 8,448,997 | B2 * | 5/2013 | Laliberte | E05B 65/08 | 49/394 |
| 8,826,598 | B2 * | 9/2014 | Ranaudo | E06B 3/5072 | 49/506 |
| 9,382,746 | B2 * | 7/2016 | Inatama | E05F 15/40 | |
| 10,280,678 | B1 * | 5/2019 | Rendon, Jr. | E06B 3/509 | |
| 2007/0180772 | A1 * | 8/2007 | Finke | E05F 15/72 | 49/280 |
| 2019/0031211 | A1 | 1/2019 | Cartier et al. | | |
| 2022/0228417 | A1 * | 7/2022 | Poltschak | E05B 81/20 | |

FOREIGN PATENT DOCUMENTS

| | | | | | |
|---|---|---|---|---|---|
| CN | 107035245 | A | | 8/2017 | |
| CN | 107225947 | A | * | 10/2017 | |
| DE | 2455520 | A1 | | 5/1976 | |
| DE | 102006032621 | A1 | | 4/2007 | |
| DE | 202008009981 | U1 | | 12/2009 | |
| EP | 1516984 | A2 | | 3/2005 | |
| FR | 2710366 | B1 | | 11/1995 | |
| JP | 2000160937 | A | | 6/2000 | |
| WO | WO-0134931 | A2 | * | 5/2001 | E05F 15/42 |
| WO | 2017132762 | A1 | | 8/2017 | |

* cited by examiner

VEHICLE DOOR DEVICE WITH A CURRENTLESS OPENING FUNCTION

CROSS REFERENCE AND PRIORITY CLAIM

This patent application is a U.S. National Phase of International Patent Application No. PCT/EP2020/063777 filed May 18, 2020, which claims priority to German Patent Application No. 10 2019 003 805.3, the disclosure of which being incorporated herein by reference in their entireties.

BACKGROUND

It is known to store potential energy in the form of potential energy or spring energy during the closing operation of the sliding door or pivoting/sliding door. After an emergency unlocking, this stored energy is then used in order to move the sliding door or pivoting/sliding door for a distance in the direction of the open position from the closed position. A further known possibility consists in providing a mechanical assembly which, during unlocking in the event of an emergency, not only overrides the existing locking of the sliding door or the pivoting/sliding door in the closed position, but also moves the sliding door or pivoting/sliding door by a certain distance in the direction of the open position by a mechanical connection. However, these solutions are all associated with a certain structural outlay.

SUMMARY

By contrast, disclosed embodiments provide a vehicle door assembly as discussed herein that, while having a simple design, permits opening of the sliding door or pivoting/sliding door by hand after an emergency unlocking. The intention is also to provide a vehicle with such a vehicle door assembly.

Disclosed embodiments relate to a vehicle door assembly and to a vehicle, for example, a rail vehicle with at least one such vehicle door assembly.

In accordance with various disclosed embodiments, a vehicle door assembly for a vehicle includes at least one sliding door which is slidable in a sliding direction in relation to a door frame having a door opening, or a pivoting/sliding door which is pivotable in a pivoting direction and is slidable in a sliding direction, by which the at least one sliding door or pivoting/sliding door is movable into a closed position closing the door opening and into an open position opening up the door opening and into any desired intermediate positions between the closed position and the open position, a door guide for guiding the at least one sliding door or pivoting/sliding door in relation to the door opening, a locking device for locking the at least one sliding door or pivoting/sliding door at least in the closed position, with an emergency unlocking device by which the at least one sliding door or pivoting/sliding door locked in the closed position can be unlocked in the event of an emergency.

Here, a vehicle should be interpreted to include any kind of vehicle, i.e., track-bound vehicles (rail vehicles) and also non-track-bound vehicles, vehicles with an engine and towed vehicles without an engine, such as trailers or towed carriages in rail vehicle combinations.

BRIEF DESCRIPTION OF THE FIGURES

Exemplary embodiments are illustrated below in the drawing and are explained in more detail in the description below. In the drawing

DETAILED DESCRIPTION

Figure 1:
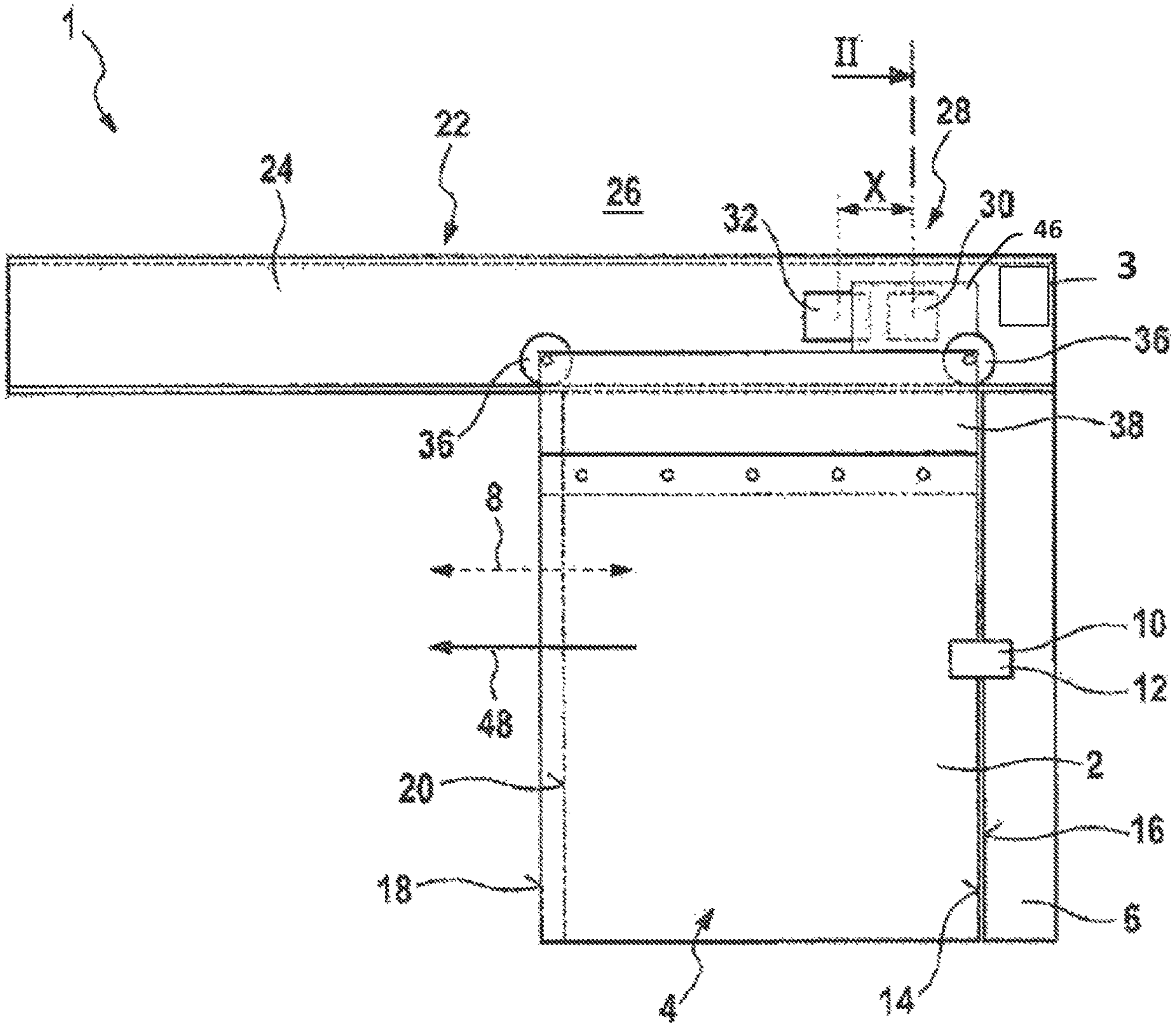
FIG. 1 shows a schematic side view of a vehicle door assembly according to a preferred embodiment with a sliding door in the closed position.

As is known, a (pure) sliding door is mounted so as to be slidable only in one or along one sliding direction between the closed position and the open position, while, starting from the closed position, a pivoting/sliding door is first of all pivoted in a pivoting direction and then slid in a sliding direction until the open position is reached. Conversely, starting from the open position, a pivoting/sliding door is first of all slid along the sliding direction and then pivoted in a pivoting direction in order to adopt the closed position. A pivoting/sliding door therefore performs a combined pivoting and sliding movement.

Disclosed embodiments provide an, optionally, electrically actuated locking device, that locks and/or unlocks the at least one sliding door at least in the closed position, for example, may be unlocked electrically and locked by motor or mechanically by the door movement. The emergency unlocking device unlocks the at least one sliding door in the event of an emergency, optionally, without the action of electrical current, this being able to take place, for example, by mechanical elements which can be operated by hand.

Disclosed embodiments utilize a door guide for guiding the at least one sliding door or pivoting/sliding door along the sliding direction or along the pivoting direction is fastened, for example, to a body of the vehicle having the door opening.

Disclosed embodiments provide an emergency opening device for the at least partial emergency opening of the at least one sliding door or pivoting/sliding door in the emergency-unlocked state is provided which includes a currentlessly acting magnetic device, which comprises at least one first permanent magnet and at least one magnetically conductive element, and which, when the at least one sliding door or pivoting/sliding door is in the closed position and has been unlocked in the event of an emergency by the emergency unlocking device, exerts a magnetic force, which is generated without action of electrical current, on the at least one sliding door or pivoting/sliding door in such a manner that the at least one sliding door or pivoting/sliding door is pushed or pulled at least for a distance in the direction of the open position from the closed position, wherein the at least one first permanent magnet is statically connected to the at least one sliding door or pivoting/sliding door and the at least one magnetically conductive element is statically connected to the door frame or to the door guide, or wherein the at least one first permanent magnet is statically connected to the door frame or to the door guide and the at least one magnetically conductive element is statically connected to the at least one sliding door or pivoting/sliding door.

The term "magnetically conductive element" is intended to be understood as including, for example, an element which is at least partially composed of a ferromagnetic or paramagnetic material. As a result, no electrical current is necessary even for the emergency opening of the at least one sliding door or pivoting/sliding door. To the contrary, a magnetic force ensures an at least partial opening of the at least one sliding door or pivoting/sliding door. Since the at least one first permanent magnet and also the at least one magnetically conductive element are in each case arranged statically on the at least one sliding door or pivoting/sliding door or on the door frame or on the door guide, e.g., there is in each case a rigid connection between the at least one first permanent magnet and also between the at least one magnetically conductive element and the at least one sliding door or pivoting/sliding door or the door frame or the door guide, there are no kinematically interacting mechanical components by which the at least one first permanent magnet and/or the at least one magnetically conductive element are mounted somewhat movably (linearly, rotationally) on the door frame and/or on the door guide and/or on the at least one sliding door or pivoting/sliding door. This results in a structurally simple design of the emergency opening device.

In the case of a sliding door, the magnetic force ensures linear pulling or pushing of the sliding door out of the closed position along the sliding direction in the direction of the open position. In the case of a pivoting/sliding door, the magnetic force (initially) ensures pivoting of the sliding door out of the closed position along the pivoting direction in the direction of the open position because, in the case of pivoting/sliding doors, the first movement out of the closed position is always a pivoting movement. If necessary, the magnetic force can move the pivoting/sliding door beyond the initial pivoting movement into the following linear sliding movement along the sliding direction.

The magnetic force may be generated by the interaction between the at least one first permanent magnet and the at least one magnetically conductive element which, at least in the closed position, is located in the magnetic flux of the at least one first permanent magnet.

For example, the magnetic force is a magnetic reluctance force which acts between the at least one first permanent magnet and the at least one magnetically conductive element in such a manner that the magnetic resistance of the magnetic flux between the at least one first permanent magnet and the at least one magnetically conductive element is reduced when at least one door or sliding door is moved from the closed position in the direction of the open position.

In accordance with at least one embodiment, the magnetic force acts as a magnetic attraction force between the at least one first permanent magnet and the at least one magnetically conductive element, wherein the at least one first permanent magnet and the at least one magnetically conductive element, as seen in the closed position of the at least one sliding door or pivoting/sliding door and in the sliding direction of the at least one sliding door or in the pivoting direction of the at least one pivoting/sliding door, are arranged offset with respect to one another by an offset in such a manner that, in the emergency-unlocked state, the magnetic attraction force pulls the at least one sliding door or pivoting/sliding door at least for a distance, namely, for example, by the offset in the direction of the open position from the closed position.

Accordingly, it can be provided that:

a) the at least one first permanent magnet is statically arranged on the at least one sliding door or pivoting/sliding door or is statically connected thereto, wherein, as seen in the sliding direction, a first portion of the door frame or of the door guide or of a first element fastened to the door frame or to the door guide has a higher magnetic conductivity than a second portion, or that b) the at least one first permanent magnet is arranged on the door frame or on the door guide or is statically connected to the door frame or to the door guide, wherein, as seen in the sliding direction, a first portion of the at least one sliding door or pivoting/sliding door or of a second element fastened to the sliding door or pivoting/sliding door has a higher magnetic conductivity than a second portion, c) wherein, in the closed position, the second portion at least partially overlaps with the at least one first permanent magnet, and the first portion, as seen in the sliding direction or pivoting direction, is arranged offset by the offset in the direction of the open position in such a manner that a magnetic attraction force arises between the first portion and the at least one first permanent magnet, the magnetic attraction force pulling the at least one sliding door or pivoting/sliding door by the offset into the open position.

The first portion then forms the magnetically more conductive portion than the second portion.

The difference in the magnetic conductivity between the first portion and the second portion can be produced by a different volume, a different area, a different mass of magnetically conductive material and/or by a different magnetic air gap with respect to the at least one first permanent magnet.

In particular, between the at least one first permanent magnet and the first portion, on the one hand, and the second portion, on the other hand, as seen in a plane perpendicular to the sliding direction of the at least one door or pivoting/sliding door, there can be a different distance d in each case which then, in an overlapping position between the at least one first permanent magnet and the first portion or between the at least one first permanent magnet and the second portion, forms a magnetic air gap of different size in each case. For example, the first portion then protrudes over the second portion, as seen in the plane perpendicular to the sliding direction of the at least one door or pivoting/sliding door and is directed toward the at least one first permanent magnet. A magnetic attraction force between the at least one permanent magnet and the first portion is then also produced because, in a first overlapping position of the least one permanent magnet with the first portion, a first magnetic air gap is smaller than a second magnetic air gap which is formed in a second overlapping position of the at least one permanent magnet with the second portion.

The second portion can also have at least one recess or a through opening in a magnetically conductive material of a wall of the door frame or of the door guide or of the first element arranged on the door frame or on the door guide, or of a wall of the at least one sliding door or pivoting/sliding door, or of the second element arranged on the at least one sliding door or pivoting/sliding door.

Furthermore, the first portion can have at least one local accumulation of magnetically conductive material on a wall of the door frame or on the door guide or on a first element arranged on the door frame or on the door guide, or on a wall of the at least one sliding door or pivoting/sliding door or on a second element arranged on the at least one sliding door or pivoting/sliding door. A local accumulation of magnetically conductive material means that a greater mass, a greater volume or a greater area of magnetically conductive material is located there than in the regions adjacent to the local accumulation.

The first element and/or the second element can be fastened here to the door frame or to the door guide or to the at least one sliding door or pivoting/sliding door in any manner and direction.

The at least one permanent magnet and the at least one magnetically conductive element can also be brought into at least a partial overlap, as seen in a direction perpendicular to the at least one sliding door, in the closed position or in an intermediate position of the at least one sliding door or pivoting/sliding door. In the at least partial overlap, then, for example, the magnetic resistance of the magnetic flux between the at least one first permanent magnet and the at least one magnetically conductive element can be minimal.

The distance between the at least one first permanent magnet and the at least one magnetically conductive element, as seen in the plane perpendicular to the sliding direction of the at least one door or pivoting/sliding door, can also be different, firstly in the closed position and secondly in an intermediate position, which is arranged adjacent to the closed position, of the least one door, the distance then forming an air gap in an overlapping position of the at least one first permanent magnet with the at least one magnetically conductive element. In particular, the difference can be smaller in the intermediate position than in the closed position, and therefore, in the emergency-unlocked state, a magnetic attraction force attracts the at least one sliding door or pivoting/sliding door from the closed position in the direction of the intermediate position.

The at least one magnetic conductive element can also be formed by at least one second permanent magnet.

According to a development of this measure, the at least one first permanent magnet and the at least one second permanent magnet can then be arranged on the door frame or on the door guide and on the at least one sliding door or pivoting/sliding door or connected to the assemblies in such a manner that a magnetic attraction force acts between unlike poles of the first and second permanent magnets (between North Pole and South Pole), the magnetic attraction force pulling the at least one sliding door or pivoting/sliding door for at least a distance in the direction of the open position in the emergency-unlocked state.

Alternatively, if the at least one magnetic conductive element is formed by a second permanent magnet, the at least one first permanent magnet and the at least one second permanent magnet can then be arranged on the door frame or on the door guide and on the at least one sliding door or pivoting/sliding door or can be connected to the assemblies in such a manner that a magnetic repulsion force acts between like poles of the first and second permanent magnets (e.g., between North Pole or between North Pole and between South Pole and South Pole), the magnetic repulsion force forcing the at least one sliding door for a distance in the direction of the open position in the emergency-unlocked state.

Disclosed embodiments also relate to a vehicle, for example, a rail vehicle having at least one above-described vehicle door assembly.

FIG. 1 shows a schematic side view of a sliding door assembly 1 of a rail vehicle as an optional embodiment of a vehicle door assembly. The sliding door assembly 1 may be designed here in single leaf form with just one door leaf or just one sliding door 2. Alternatively, disclosed embodiments can also be used in the case of a multi-leaf and, for example, two-leaf sliding door assembly with two sliding doors.

The sliding door assembly 1 here has a sliding door 2 which is slidable in relation to a door frame 6, which has a door opening 4, in a sliding direction symbolized by the double arrow 8, shown by a dashed line in FIG. 1. In addition, the sliding door assembly 1 comprises, for example, an electrical drive device 3 which is not shown here for clarity reasons and by which the sliding door 2 is movable into a closed position closing the door opening 4 and into an open position opening up the door opening 4 and into any desired intermediate positions between the closed position and the open position.

Furthermore, the sliding door assembly 1 also comprises, for example, an electrical locking device 10 for locking the sliding door 2 at least in the closed position, with an emergency unlocking device 12, by which the at least one sliding door 2, which is locked in the closed position, can be unlocked in the event of an emergency. The emergency unlocking device 12 may be actuable purely mechanically, for example, via a cable pull mechanism operable by hand, and therefore no current is required for the unlocking in the event of an emergency. In the exemplary embodiment shown, in the closed position (FIG. 1), a first vertical sliding door edge or a closing edge 14 of the sliding door 2 enters into contact with a first vertical frame part 16 of the door frame 6. In the closed position, the second vertical sliding door edge 18 overlaps a second vertical frame part 20 of the door frame 6, which frame part is shown in FIG. 1 by a dashed line, and therefore the door opening 4 between the two vertical frame parts 16, 20 and horizontal frame parts (not shown here) of the door frame 6 is completely closed.

The sliding door 1 is mounted slidably in the sliding direction 8 on a door guide 22, wherein the door guide 22 here includes, for example, an upper carrier plate 24 which is held on a body 26 of the rail vehicle. Furthermore, the upper carrier plate 24 is arranged parallel to an upper horizontal frame part of the door frame 6. In addition to the upper carrier plate 24, the door guide 22 can also have further carrier elements by which the sliding door 2 is mounted slidably on the body 26.

Not least, an emergency opening device is provided for the at least partial emergency opening of the sliding door in the emergency-unlocked state. The emergency opening device includes a currentlessly acting magnetic device 28 which, when the sliding door 2 is located in the closed position shown in FIG. 1 and has been unlocked in the event of an emergency by the emergency unlocking device 12, a magnetic force generated without the action of electrical current is exerted on the sliding door 2 in such a manner that the sliding door 2 is pushed or pulled for at least a distance in the direction of the open position from the closed position.

In the exemplary embodiment of FIG. 1, the magnetic device 28 includes a first permanent magnet 30 and a magnetically conductive element 30, wherein the first permanent magnet 30 is fastened statically, for example, to the sliding door 2 and the magnetically conductive element 32 is fastened statically, for example, to the door guide 22. However, the reverse arrangement of first permanent magnet 30 and magnetically conductive element 32 is also conceivable, and therefore the first permanent magnet 30 is then fastened statically to the door guide 22 and the magnetically conductive element 32 is fastened statically to the sliding door 2.

The upper carrier plate 24 forming at least part of the door guide 22 here has here, for example, an approximately Z-shaped cross section, wherein a first limb 34 of the carrier plate 24 that runs in a horizontal plane forms a flat roller track for rollers 36 which are held on connecting parts 38 so as to be rotatable about axes of rotation 40 which are oriented perpendicularly to the plane of the sliding door 2. The connecting parts 38 connect the rollers 36 to the sliding door 2, and therefore the sliding door 2 is slidable or rollable via the rollers 36 in the sliding direction 8 in relation to the door frame 6 and along the carrier plate 24. The door guide 22 can alternatively also be designed as a recirculating ball bearing guide. Furthermore, the upper carrier plate 24 can also have a U-shaped cross section.

A second limb 42, which is oriented approximately vertically in the use position, of the carrier plate 24 bears the magnetically conductive element 32, for example, in the form of, for example, a cubic body which is composed of magnetically conductive ferromagnetic material. The third limb 44 of the carrier plate 24 is connected to the body 26 of the rail vehicle. The relatively small wall thickness of the carrier plate 24 itself means that it is less magnetically conductive than the magnetically conductive element 32. The magnetically conductive element 32 consequently forms a type of “accumulation” of magnetically conductive material in relation to the carrier plate 24. In particular, the magnetically conductive element 32 forms part of the carrier plate 42 and is composed of the same magnetically conductive ferromagnetic material as the latter.

In the present example, two rollers 36 each having a connecting part 38 are present on a horizontal sliding door edge, which is at the top in the use position, in each case on the end side, e.g., in the region of the two vertical sliding door edges 14, 18. On the roller 36 which faces the vertical first frame part 16 of the door frame 6, on which a frame-side part of the locking device 10 is formed, for example, opposite the connecting part 38, there is a supporting part 46 which is connected to the connecting part 38 and therefore also to the sliding door 2. The roller 36 is then mounted rotationally, for example, on the connecting part 38 and the supporting part 46. The supporting part 46 here bears, for example, the first permanent magnet 30. As seen in a direction perpendicular to the plane of the sliding door 2, the first permanent magnet 30 which is fastened to the sliding door 2 overlaps the magnetically conductive element 32, which is fastened to the carrier plate 24, in an intermediate position between the closed position and the open position of the sliding door 2. In the intermediate position, the sliding door 2 is then open by an offset X.

By contrast, in the closed position of the sliding door 2 that is shown in FIG. 1, the first permanent magnet 30 which is connected to the sliding door 2 is offset by the offset X in relation to the magnetically conductive element 32 on the carrier plate 24, as seen in the sliding direction 8 of the sliding door 2, wherein the offset X of the magnetically conductive element 32 extends in the direction of the open position from the first permanent magnet 30.

The case will now be assumed below in which there has been a current failure at the rail vehicle and then the sliding door 2 cannot be unlocked as customary by electrical actuation of the locking device 10 in the closed position in order then to be brought into the open position by the drive device. To the contrary, the emergency locking device 12 which is operative even currentlessly is then used for unlocking the sliding door in the closed position.

In the closed position of the emergency-unlocked sliding door 2, a magnetic force in the form of a magnetic reluctance force 48 then acts between the first permanent magnet 30 and the magnetically conductive element 32 in such a manner or in such a direction that the magnetic resistance of the magnetic flux between the first permanent magnet 30 and the magnetically conductive element 32 is reduced. Consequently, in the case of the example described here, the magnetic reluctance force 48 in the form of an attraction force acts between the first permanent magnet 30 and the magnetically conductive element 32, which is arranged offset with respect thereto by the offset X in the sliding direction, because here, for example, the carrier plate 24 has a substantially lower magnetic conductivity than the magnetically conductive element 32, and the magnetic reluctance force 48 now attempts to reduce the magnetic resistance by moving the first permanent magnet 30 toward the magnetically conductive element 32.

Figure 2:
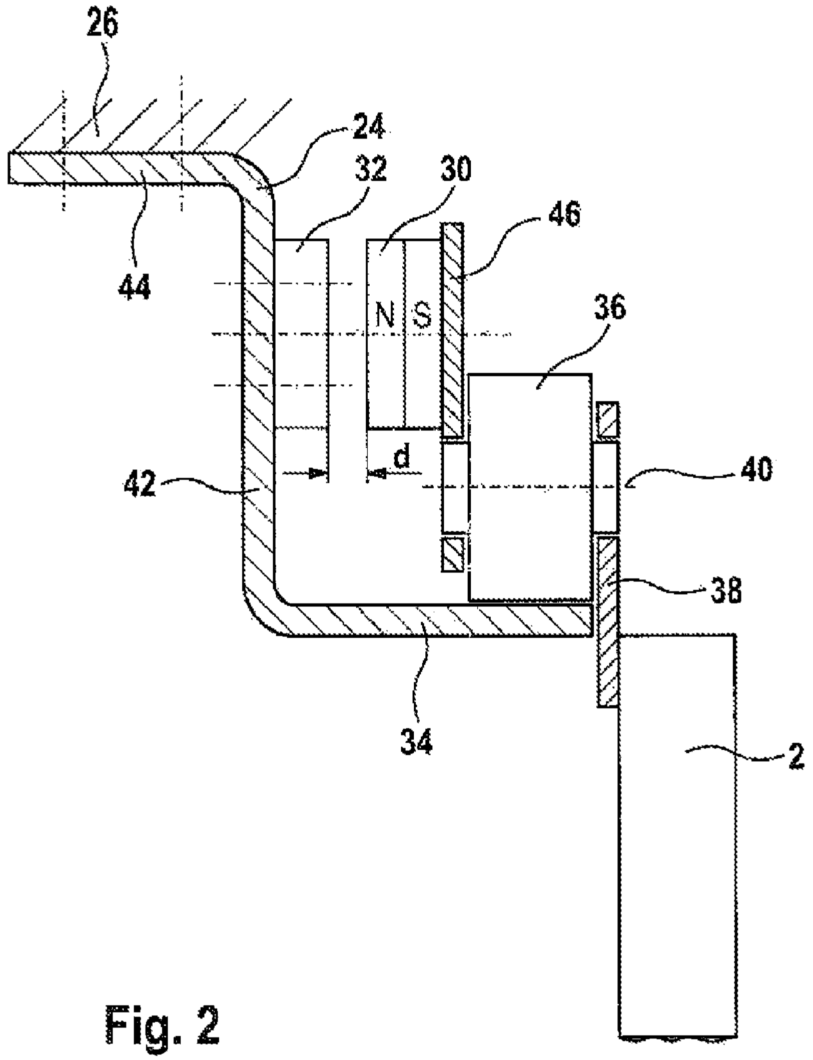
FIG. 2 shows a sectional illustration along the line II of FIG. 1.

In addition, the reluctance force 48 arises because the magnetically conductive element 32 is arranged on the carrier plate in a manner protruding in the direction of the first permanent magnet 30 and then, as is easily conceivable with reference to FIG. 2, between the first permanent magnet 30 and the magnetically conductive element 32, as seen in the plane perpendicular to the sliding direction of the door 2, the distance d between the first permanent magnet 30 and the magnetically conductive element 32 becomes minimal in the overlapping position. This distance d forms a magnetic air gap between the first permanent magnet 30 and the magnetically conductive element 32. In the overlapping position of the first permanent magnet 30 with the magnetically conductive element 32, the magnetic air gap is then smaller than in non-overlapping positions deviating therefrom and, for example, in the closed position, and therefore, in the overlapping position, the magnetic resistance is at the lowest and the magnetic conductivity at the highest.

The magnetic reluctance force 48 acting on the sliding door 2 is symbolized in FIG. 1 by the solid-line arrow. The magnetic reluctance force 48 then moves the emergency-unlocked sliding door 2 in the opening direction until the first permanent magnet 30 on the sliding door 2 overlaps the magnetically conductive element 32 on the carrier plate 24 of the door guide 22, the magnetic resistance, in this position, being minimal in the sliding direction 8 and then a magnetic reluctance force 48 no longer acting at least in the sliding direction 8.

The offset X between the first permanent magnet 30 and the magnetically conductive element 32 in the sliding direction corresponds to a desirably arising gap between the first vertical frame part 16 of the door frame 6 and the first vertical sliding door edge 14, the gap coming about by the magnetic reluctance force 48 in the overlapping position between first permanent magnet 30 and magnetically conductive element 32. The position of the sliding door 2 then corresponds to an intermediate position between the closed position and the open position. This gap makes it possible for a person to be able to reach with their fingers into the gap and then move the sliding door 2 by hand from the intermediate position into the open position, in order, for example, to be able to exit from the rail vehicle. Since the driving device is not capable of applying any counterforces in the event of the current failure assumed here, this can be brought about without great effort.

Figure 3:
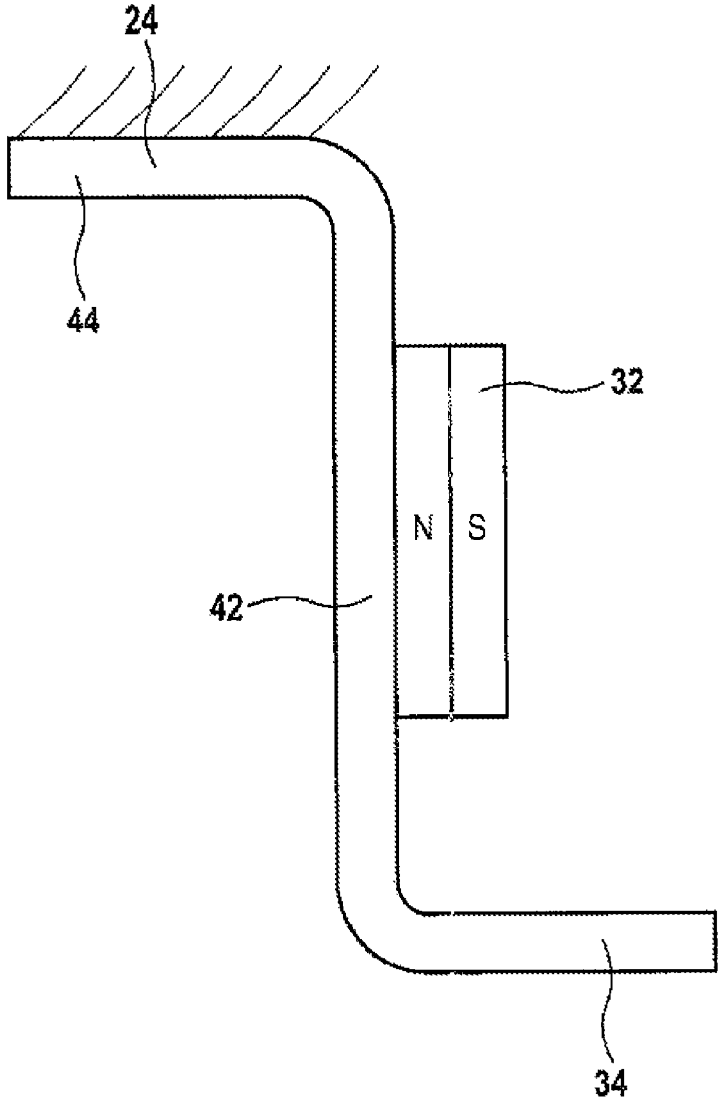
FIG. 3 shows a sectional illustration through a vehicle door assembly according to a further embodiment with the sliding door in the closed position.
Figure 4:
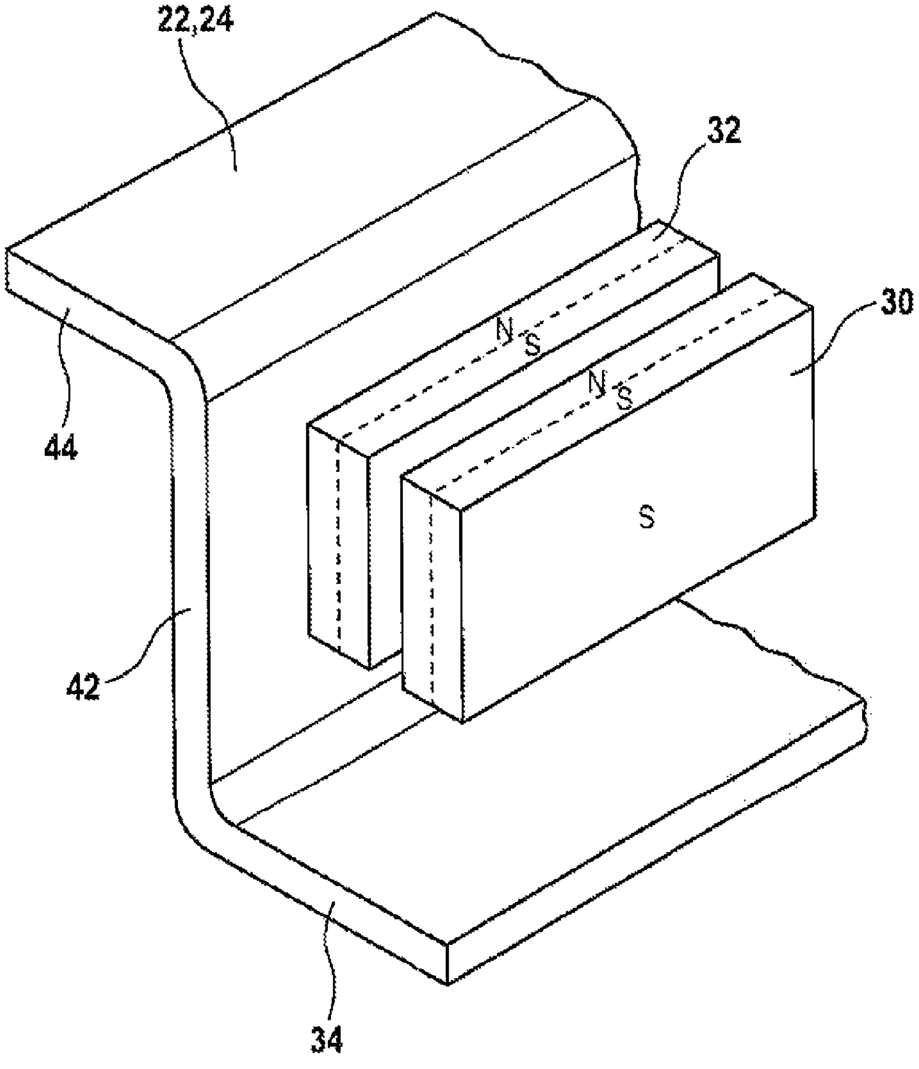
FIG. 4 shows a perspective view of the vehicle door assembly from FIG. 3 with the sliding door in an intermediate position, which is open for a distance, between the closed position and the open position.

The difference of the further embodiment of FIG. 3 and FIG. 4 over the embodiment of FIG. 1 and FIG. 2 include a magnetically conductive element 32 which is fastened to the carrier plate 24 is formed by a second permanent magnet which then, in the closed position of the sliding door 2, likewise has an offset X with respect to the first permanent magnet 30 which is fastened to the sliding door 2. The polarization of the first permanent magnet 30 and of the second permanent magnet 32 is then such that, in the overlapping position shown in FIG. 4, unlike poles (North Pole and South Pole) lie opposite one another such that, in the closed position, a magnetic attraction force acts as reluctance force 48 between the two permanent magnets 30, 32 which pull the sliding door 2 in the direction of the open position by the offset X in the emergency-unlocked position.

Figure 5:
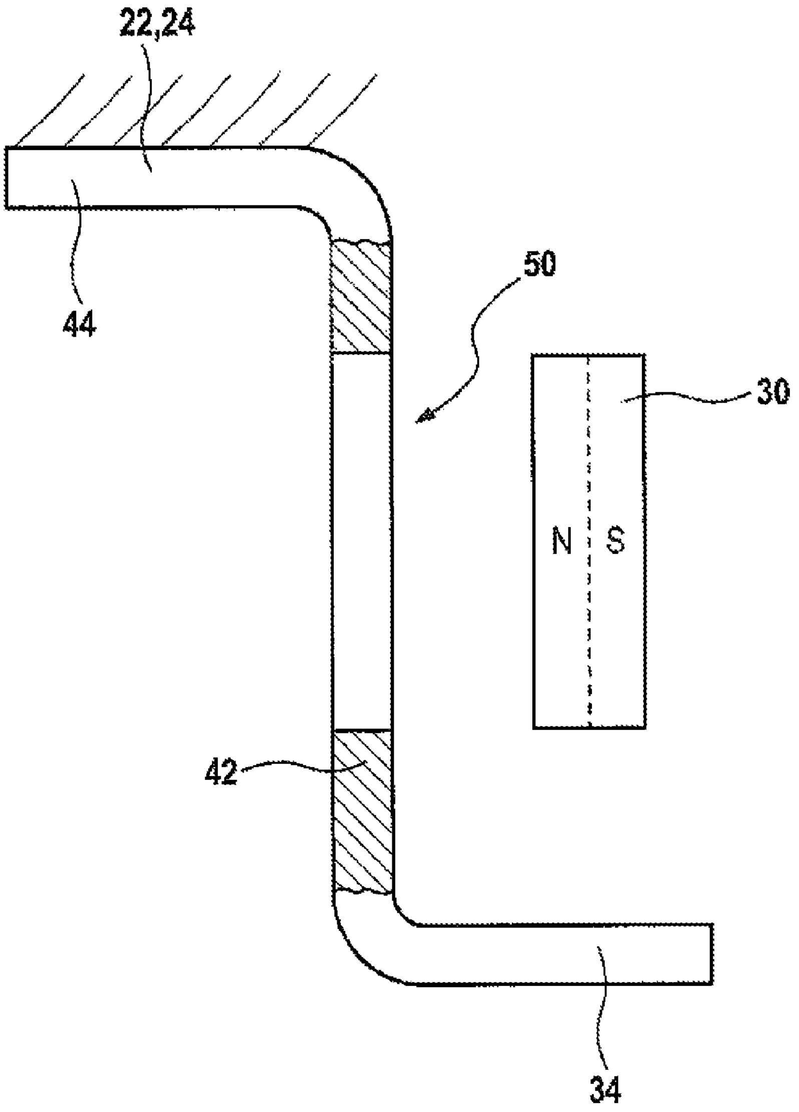
FIG. 5 shows a sectional illustration through a vehicle door assembly according to a further embodiment with the sliding door in the closed position.

FIG. 5 shows a sectional illustration through a sliding door assembly 1 according to a further embodiment, with the sliding door 2 being in the closed position. In this embodiment, the sliding door 2 likewise bears the first permanent magnet 30. In the closed position, a local through opening 50 is formed in the wall of the second limb 42 of the carrier plate 24 opposite the first permanent magnet 30.

Consequently, in the closed position, the first permanent magnet 30 approximately overlaps the through opening 50, with the magnetic resistance being relatively large. In order to reduce the magnetic resistance, a magnetic reluctance force 48 then arises which attempts to pull the first permanent magnet 30 together with the sliding door 2 in the direction of higher magnetic conductivity. Since, however, the carrier plate 24 is, for example, magnetically conductive, the reluctance force 48 acts in the sliding direction 8 toward the edge of the through opening 50 in the carrier plate 24 and therefore in the opening direction of the sliding door 2. The first portion of the carrier plate 24 which, as seen in the sliding direction 8, adjoins the through opening 50 and, in the closed position, is arranged offset by the offset X in relation to the first permanent magnet 30, then forms an "accumulation" of magnetically conductive material in relation to a second portion of the carrier plate, which portion is then formed by the through opening 50 which, by contrast, has only very small magnetic conductivity (air), if any at all, which corresponds to a "reduction" of magnetically conductive material in the region of the through opening 50.

The magnetic reluctance force 48 which moves the sliding door in the direction of the open position is therefore based on a difference in the magnetic conductivity between the first portion of the carrier plate 24 in the form of the uninterrupted wall of the carrier plate 24 and the second portion of the carrier plate 24 in the form of the through opening 50 of the carrier plate 24, wherein, as seen in the sliding direction 8, in the closed position the first and second portions are arranged one behind the other and are offset by the offset X in relation to one another. The difference in the magnetic conductivity between the first portion and the second portion of the carrier plate 24 can therefore be produced by a different volume, a different area, a different mass of magnetically conductive material and/or by a different magnetic air gap d.

According to a further exemplary embodiment, not illustrated here, the magnetically conductive element 32 is likewise formed by a second permanent magnet which is fastened, for example, in turn to the carrier plate 24. The first permanent magnet 30 is likewise fastened again to the sliding door 2, wherein the first permanent magnet 30 and the second permanent magnet 32 overlap in the closed position of the sliding door 2, but then with like poles lying opposite one another, e.g., North Pole and North Pole or South Pole and South Pole. Consequently, in the closed position of the sliding door 2, a magnetic repulsion force acts between the like poles, the magnetic repulsion force then pushing the sliding door 2 for a distance in the direction of the open position in the emergency-unlocked state.

Instead of being fastened to the carrier plate 24 or to the door guide 22, the magnetically conductive element 32 or the second permanent magnet 32 could also be fastened to the door frame 6 in such a manner that a magnetic reluctance force 48 is produced in the form of a magnetic attraction or repulsion force which pulls or pushes the sliding door 2 at least for a distance into the open position from the closed position.

Furthermore, it does not matter whether the first permanent magnet 30 is statically connected to the sliding door 2 and the magnetically conductive element 32 or the second permanent magnet 32 to the door frame 6 or to the door guide 22. The conditions may also be reversed.

The above-described principle of opening a sliding door 2 of a sliding door assembly 1 in the event of an emergency with the aid of a magnetic reluctance force 48 can readily also be transferred to a pivoting/sliding door assembly with at least one pivoting/sliding door, with the sole difference consisting in that a pivoting/sliding door from the closed position first of all executes a pivoting movement which then merges later into a pure sliding movement. The first permanent magnet 30 and the magnetically conductive element 32 can then be correspondingly arranged such that the direction of the magnetic force or of the reluctance force 48 acts in the pivoting direction in order to achieve the desired partial opening of such a pivoting/sliding door.

LIST OF REFERENCE SIGNS

1 Sliding door assembly
2 Sliding door
3 Electrical drive device
4 Door opening
6 Door frame
8 Sliding direction
10 Locking device
12 Emergency unlocking device
14 First vertical sliding door edge
16 First vertical frame part
18 Second vertical sliding door edge
20 Second vertical frame part
22 Door guide
24 Upper carrier plate
26 Body
28 Magnetic device
30 First permanent magnet
32 Magnetically conductive element
34 First limb
36 Rollers
38 Connecting part
40 Axis of rotation
42 Second limb
44 Third limb
46 Supporting part
48 Reluctance force
50 Through opening
X Offset

The invention claimed is:

1. A vehicle door assembly comprising:

at least one sliding door which is slidable in a sliding direction in relation to a door frame having a door opening, or a sliding plug door which is pivotable in a pivoting direction and is slidable in the sliding direction, a drive device by which the at least one sliding door or the sliding plug door is movable into a closed position closing the door opening and into an open position opening up the door opening and into any desired intermediate positions between the closed position and the open position, a door guide for guiding the at least one sliding door or the sliding plug door relative to the door opening, a locking device for locking the at least one sliding door or the sliding plug door at least in the closed position, with an emergency unlocking device by which the at least one sliding door or the sliding plug door locked in the closed position is unlocked in event of an emergency, an emergency opening device for an at least partial emergency opening of the at least one sliding door or the sliding plug door in an emergency-unlocked state, wherein the emergency opening device includes a currentlessly acting magnetic device, which includes at least one first permanent magnet and at least one magnetically conductive element, wherein, while the at least one sliding door or the sliding plug door is in the closed position and has been unlocked, the emergency opening device exerts a magnetic force in response to an emergency by the emergency unlocking device, wherein the magnetic force is generated without action of electrical current, on the at least one sliding door or pivoting/sliding door such that the at least one sliding door or the sliding plug door is pushed or pulled at least for a distance in the direction of the open position from the closed position, wherein the at least one first permanent magnet is statically connected to the at least one sliding door or the sliding plug door and the at least one magnetically conductive element is statically connected to the door frame or to the door guide, or wherein the at least one first permanent magnet is statically connected to the door frame or to the door guide and the at least one magnetically conductive element is statically connected to the at least one sliding door or the sliding plug door.

2. The vehicle door assembly of claim 1, wherein the magnetic force is generated by interaction between the at least one first permanent magnet and the at least one magnetically conductive element which, at least in the closed position, is located in magnetic flux of the at least one first permanent magnet.

3. The vehicle door assembly of claim 2, wherein the magnetic force is generated by interaction between the at least one first permanent magnet and the at least one magnetically conductive element which, at least in the closed position, is located in magnetic flux of the at least one first permanent magnet.

4. The vehicle door assembly of claim 2, wherein the magnetic force is a magnetic reluctance force which acts between the at least one first permanent magnet and the at least one magnetically conductive element such that the magnetic resistance of the magnetic flux between the at least one first permanent magnet and the at least one magnetically conductive element is reduced when the at least one sliding door or the sliding plug door is moved from the closed position towards the open position.

5. The vehicle door assembly of claim 2, wherein the magnetic force acts as a magnetic attraction force between the at least one first permanent magnet and the at least one magnetically conductive element, wherein the at least one first permanent magnet and the at least one magnetically conductive element, as seen in the closed position of the at least one sliding door or the sliding plug door and, in the sliding direction of the at least one sliding door or in the pivoting direction of the at least one the sliding plug door, are arranged offset with respect to one another by an offset such that, in the emergency-unlocked state, the magnetic attraction force pulls the at least one sliding door or the sliding plug door by the offset toward the open position from the closed position.

6. The vehicle door assembly of claim 5, wherein a) the at least one first permanent magnet is connected on the at least one sliding door, wherein, as seen in the sliding direction or pivoting direction, a first portion of one of the door frame, the door guide, a first element fastened to the door frame, or to the door guide has a higher magnetic conductivity than a second portion, or b) the at least one first permanent magnet is statically connected to the door frame or to the door guide, wherein, as seen in the sliding direction or pivoting direction, a first portion of at least one sliding door or of a second element fastened to the sliding door or the sliding plug door has a higher magnetic conductivity than a second portion, wherein, in the closed position, the second portion at least partially overlaps with the at least one first permanent magnet and the first portion, as seen in the sliding direction or pivoting direction, is arranged offset by the offset in the direction of the open position such that a magnetic attraction force arises between the first portion and the at least one first permanent magnet, the magnetic attraction force pulling the least one sliding door by the offset into the open position.

7. The vehicle door assembly of claim 6, wherein the difference in the magnetic conductivity between the first portion and the second portion is produced by a different volume of magnetically conductive material, a different area of magnetically conductive material, a different mass of magnetically conductive material or by a different magnetic air gap with respect to the at least one first permanent magnet.

8. The vehicle door assembly of claim 6, wherein the second portion has at least one recess or a through opening in one of:

the door frame, the door guide, the first element arranged on the door frame or on the door guide, a wall of the at least one sliding door or the sliding plug door, or the second element arranged on the at least one sliding door or the sliding plug door.

9. The vehicle door assembly of claim 6, wherein the first portion has at least one local accumulation of magnetically conductive material on one of:

a wall of the door frame, the door guide or on the first element arranged on the door frame, the door guide, a wall of the at least one sliding door or the sliding plug door, or the second element arranged on the at least one sliding door or the sliding plug door.

10. The vehicle door assembly of claim 1, wherein the magnetic force is a magnetic reluctance force which acts between the at least one first permanent magnet and the at least one magnetically conductive element such that the magnetic resistance of the magnetic flux between the at least one first permanent magnet and the at least one magnetically conductive element is reduced when at least one sliding door or the sliding plug door is moved from the closed position towards the open position.

11. The vehicle door assembly of claim 1, wherein the magnetic force acts as a magnetic attraction force between the at least one first permanent magnet and the at least one magnetically conductive element, wherein the at least one first permanent magnet and the at least one magnetically conductive element, as seen in the closed position of the at least one sliding door or the sliding plug door and, in the sliding direction of the at least one sliding door or in the pivoting direction of the at least one the sliding plug door, are arranged offset with respect to one another by an offset such that, in the emergency-unlocked state, the magnetic attraction force pulls the at least one sliding door or the sliding plug door by the offset toward the open position from the closed position.

12. The vehicle door assembly of claim 11, wherein a) the at least one first permanent magnet is connected on the at least one sliding door, wherein, as seen in the sliding direction or pivoting direction, a first portion of one of the door frame, the door guide, a first element fastened to the door frame, or to the door guide has a higher magnetic conductivity than a second portion, or b) the at least one first permanent magnet is statically connected to the door frame or to the door guide, wherein, as seen in the sliding direction or pivoting direction, a first portion of at least one sliding door or of a second element fastened to the sliding door or the sliding plug door has a higher magnetic conductivity than a second portion, wherein, in the closed position, the second portion at least partially overlaps with the at least one first permanent magnet and the first portion, as seen in the sliding direction or pivoting direction, is arranged offset by the offset in the direction of the open position such that a magnetic attraction force arises between the first portion and the at least one first permanent magnet, the magnetic attraction force pulling the least one sliding door by the offset into the open position.

13. The vehicle door assembly of claim 12, wherein the difference in the magnetic conductivity between the first portion and the second portion is produced by a different volume of magnetically conductive material, a different area of magnetically conductive material, a different mass of magnetically conductive material or by a different magnetic air gap with respect to the at least one first permanent magnet.

14. The vehicle door assembly of claim 12, wherein the second portion has at least one recess or a through opening in a magnetically conductive material of a wall of one of:

the door frame, the door guide, the first element arranged on the door frame or on the door guide, a wall of the at least one sliding door or the sliding plug door, or the second element arranged on the at least one sliding door or the sliding plug door.

15. The vehicle door assembly of claim 12, wherein the first portion has at least one local accumulation of magnetically conductive material on one of:

a wall of the door frame, the door guide or on the first element arranged on the door frame, the door guide, a wall of the at least one sliding door or the sliding plug door, or the second element arranged on the at least one sliding door or the sliding plug door.

16. The vehicle door assembly of claim 12, wherein the at least one first permanent magnet and the at least one magnetically conductive element can be brought at least into a partial overlap, as seen in a direction perpendicular to the plane of the at least one sliding door or the sliding plug door, in the closed position or in an intermediate position of the at least one sliding door.

17. The vehicle door assembly of claim 1, wherein the at least one magnetically conductive element is formed by at least one second permanent magnet.

18. The vehicle door assembly of claim 17, wherein the at least one first permanent magnet and the at least one second permanent magnet are connected to the door frame or to the door guide and to the at least one sliding door or the sliding plug door such that a magnetic attraction force acts between unlike poles of the first and second permanent magnets, the magnetic attraction force pulling the at least one sliding door or the sliding plug door at least for a distance in the direction of the open position in the emergency-unlocked state.

19. The vehicle door assembly of claim 1, wherein the at least one magnetically conductive element is formed by a second permanent magnet, wherein the at least one first permanent magnet and the at least one second permanent magnet are connected to the door frame or to the door guide and to the at least one sliding door or the sliding plug door in such a manner that a magnetic repulsion force acts between like poles of the first and second permanent magnets, the magnetic repulsion force forcing the at least one sliding door or the sliding plug door for a distance in the direction of the open position in the emergency-unlocked state.

20. A rail vehicle with at least one vehicle door assembly as claimed in claim 1.

* * * * *